July 26, 1927.
J. P. HEIL ET AL
SAFETY VENT VALVE
Filed Feb. 9, 1923
1,637,076
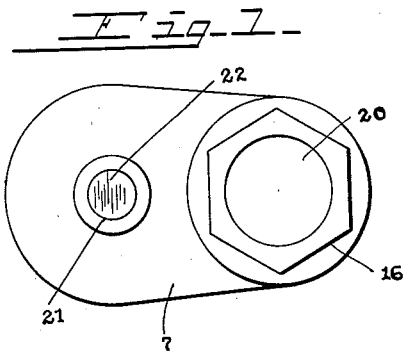
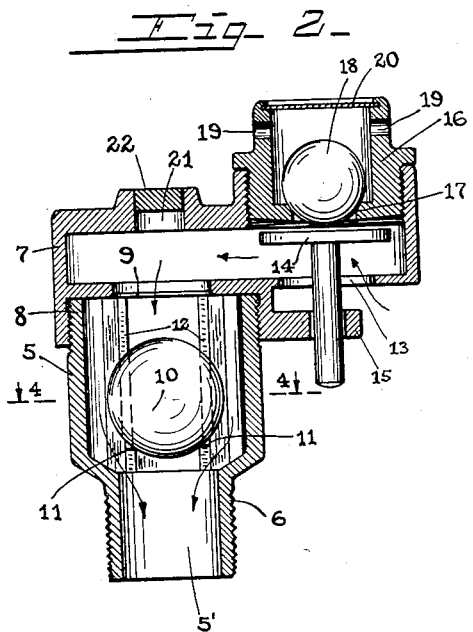
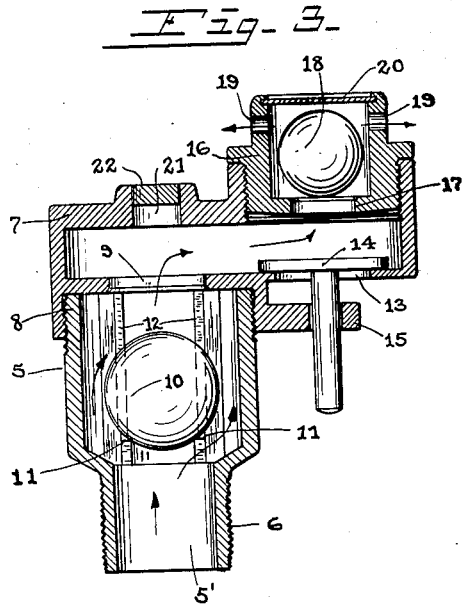
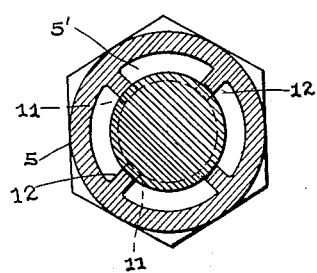
INVENTOR.
Julius P. Heil and
BY Arthur Borchardt.
Morsell, Keeney & Morsell
ATTORNEYS.

Patented July 26, 1927.

1,637,076

UNITED STATES PATENT OFFICE.

JULIUS P. HEIL AND ARTHUR BORCHARDT, OF MILWAUKEE, WISCONSIN.

SAFETY VENT VALVE.

Application filed February 9, 1923. Serial No. 618,165.

This invention relates to improvements in safety vent valves, more particularly adapted for use on truck tanks for dispensing gasoline, oils or other liquids.

Tanks, and more particularly truck tanks for dispensing gasoline, oil and other like liquids, require an upper air vent opening to permit the entrance of air in drawing the liquid from the tank, and also to permit the escape of gas generated from the liquid in the tank. It is also desirable to provide means for automatically closing the vent in case the truck is accidentaly tipped over, to prevent the loss of the contents of the tank, and it is furthermore desirable to provide a vent valve with means for permitting the rapid escape of gas generated in the tank in the event the contents of the tank is on fire.

It is one of the objects of the present invention to provide a safetly vent valve possessing all of the before-mentioned desirable features, which is of very simple construction.

A further object of the invention is to provide a safety vent valve which only requires one opening in the tank for attachment, and while normally closed will automatically open to let in air in drawing liquid from the tank and will automatically open to permit the escape of gas when the pressure exceeds a predetermined amount.

A further object of the invention is to provide a safety vent valve in which an inlet valve, an outlet valve, a valve for preventing the loss of liquid in the event the tank tips over, and a fuse valve are all included in the same structure.

With the above and other objects in view, the invention consists of the improved safety vent valve and its parts and combinations as set forth in the claims, and all equivalents thereof.

In the accompanying drawing in which the same reference characters indicate the same parts in all of the views:

Fig. 1 is a top view of the improved safety vent valve;

Fig. 2 is a vertical sectional view thereof showing the air intake valve in open position;

Fig. 3 is a similar view with the gas outlet valve in open position; and

Fig. 4 is a horizontal sectional view thereof, taken on line 4—4 of Fig. 2.

Referring to the drawing, the numeral 5 indicates a tubular main valve casing which is open and also threaded at both ends. The lower threaded end portion 6 is of less diameter than the upper portion and is adapted to thread into the upper portion of a gasoline or other tank (not shown). A supplemental valve casing 7 is threaded on the upper or larger end portion 8 of the casing 5 and is formed with a main valve seat and opening 9 which is adapted to be closed by an emergency ball valve 10 when the casing is tipped over to prevent the escape of gasoline or other liquid from the tank. The said valve is positioned in the casing 5 and normally rests upon the shoulder 11 of the vertical ribs 12 formed on the inner wall of the casing 5. Said shoulders and ribs hold the valve spaced from the inner wall and the lower reduced portion of the casing so that the bore 5' thereof is free for the passage of air or gas therethrough. The supplemental casing 7 projects laterally from the casing 5 and is provided with an air inlet opening 13 closed by a stem valve 14 opening inwardly in the casing to admit air to the tank when liquid is drawn from the tank. Said stem valve is formed of aluminum or other light weight material in order to open easily and the stem of the valve is guided in a guide member 15 projecting outwardly from the supplemental casing beneath the valve opening 13.

The supplemental casing 7, immediately above the valve 14 and in axial alinement therewith, is open and is provided with a tubular valve seat plug 16 threaded therein and having a valve seat 17 formed in its lower portion immediately above the valve 14. A ball valve 18 mounted in the tubular portion of the plug and resting upon the seat 17 is adapted to open by the pressure of gas generated in the tank. Openings 19 formed in the side walls of the plug 16 above the valve seat permit the escape of the gas therethrough which passes through the valve seat 17. A disk 20 closing the upper end of the bore of the plug maintains the valve in the plug.

The upper wall of the supplemental casing in axial alinement with the bore of the casing 5 is formed with an emergency opening 21 which is closed by a fusible plug 22, so that in case of fire the plug 22 would fuse and permit the rapid discharge of gas which may be generated at a greater rate than the capacity of the openings 17 and 19 to permit the escape thereof.

In operation, the air inlet valve 14 will open in drawing liquid from the tank to permit the entrance of air and the free flow of the liquid. Now in case of the generation of gas in the tank, the pressure thereof will raise the discharge valve 18 and permit the discharge of said gas through the seat opening of said valve. In the event of fire and the rapid generation of gas, the heat of the fire will fuse the plug 22 and provide a free exit for the rapid discharge of the gas. In the event that the tank truck is tipped over, the emergency valve 10 will close the main opening of the valve seat 9 and prevent the escape of the liquid within the tank. When not drawing liquid from the tank, all of the openings are closed, thus preventing loss by evaporation.

From the foregoing description it will be seen that the safety vent valve is well adapted to expedite the discharge of liquid from a tank and prevent the loss by evaporation and at the same time permit the escape of gas which might cause trouble.

What we claim as our invention is:

1. A safety vent valve, comprising a main valve casing open at its upper and lower ends, a supplemental valve casing mounted on the upper end portion of said valve casing and having a valve outlet opening above the main casing and an inlet valve opening offset therefrom and an outlet opening above the offset opening, a valve positioned in the main casing for closing the valve opening adjacent thereto but being normally in open position, a comparatively light weight valve closing the inlet opening, a valve plug mounted in the supplemental casing opening above the inlet opening and having an outlet opening formed therein and a valve closing said outlet opening.

2. A safety vent valve, comprising a main valve casing open at its upper and lower ends, a supplemental valve casing mounted on the upper end portion of said valve casing and having a valve outlet opening above the main casing and an inlet valve opening offset therefrom and an outlet opening above the offset opening, said supplemental casing also having an emergency opening adjacent the outlet opening from the main casing, a fusible plug closing said emergency opening, a valve positioned in the main casing for closing the valve opening adjacent thereto but being normally in open position, a comparatively light weight valve closing the inlet opening, a valve plug mounted in the supplemental casing opening above the inlet opening and having an outlet opening formed therein, and a valve closing said outlet opening.

3. A safety vent valve, comprising a main valve casing open at its upper and lower ends, a supplemental valve casing having a threaded engagement with the upper end of the main casing and having a valve outlet opening above the main casing and inlet opening offset therefrom and an outlet opening above the offset opening, a valve plug mounted in the supplemental casing outlet opening above the offset opening and having an outlet opening formed therein, a ball valve closing said outlet opening, a ball valve positioned in the main casing for closing the valve opening adjacent thereto but being normally in open position, and a comparatively light weight stem valve closing the inlet opening.

4. A safety vent valve, comprising a main valve casing open at its upper and lower ends, a supplemental valve casing having a threaded engagement with the upper end of the main casing and having a valve outlet opening above the main casing and an inlet opening offset therefrom and an outlet opening above the offset opening, said supplemental casing also having an emergency opening adjacent the outlet opening from the main casing, a fusible plug closing said emergency opening, a valve plug mounted in the supplemental casing outlet opening above the offset opening and having an outlet opening formed therein, a ball valve closing said outlet opening, a ball valve positioned in the main casing for closing the valve opening adjacent thereto but being normally in open position, and a comparatively light weight stem valve closing the inlet opening.

In testimony whereof, we affix our signatures.

JULIUS P. HEIL.
ARTHUR BORCHARDT